Sept. 12, 1961 E. M. WELCH 2,999,421
CAMERA AND PROJECTOR SYSTEM
Filed Nov. 20, 1957 8 Sheets-Sheet 2

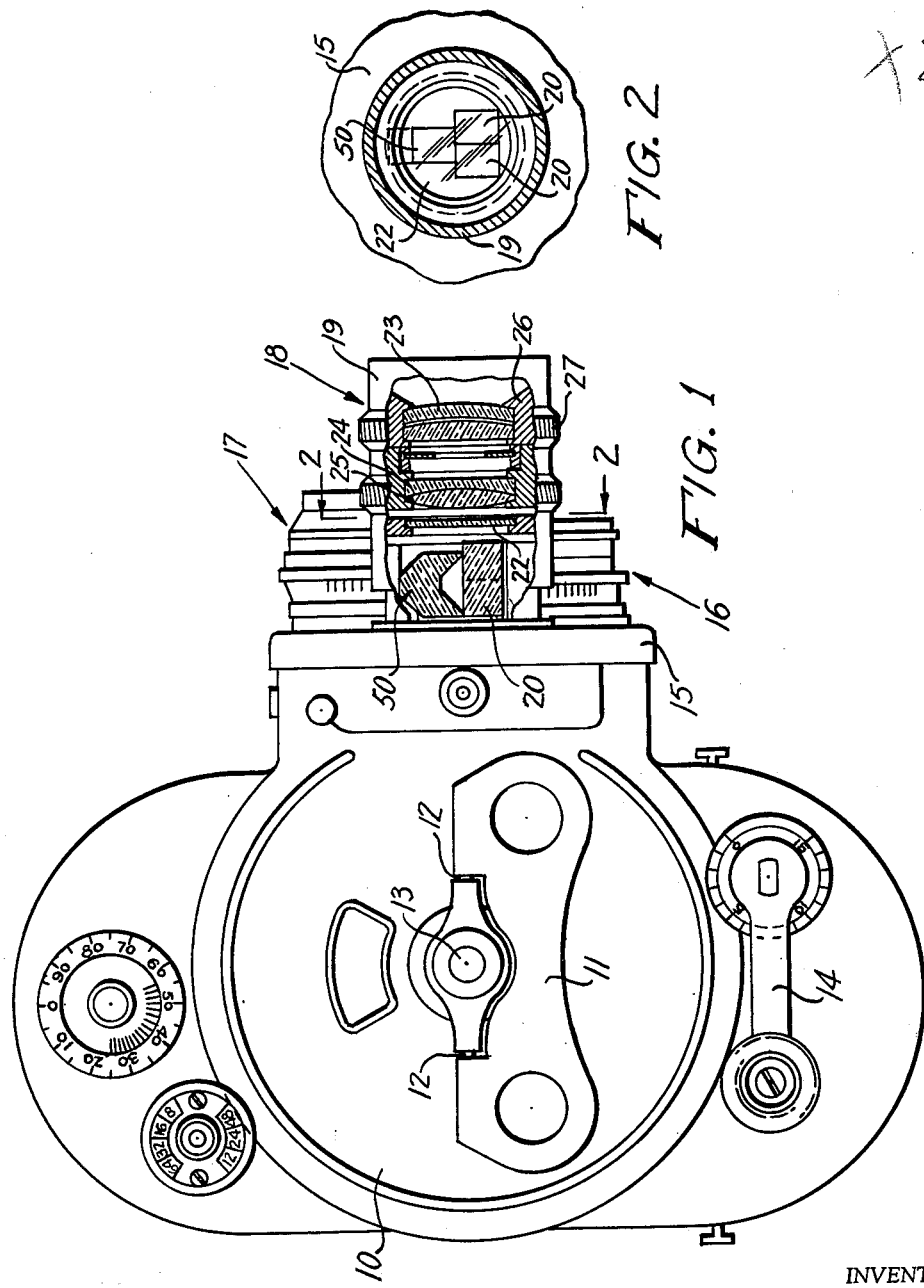

INVENTOR
EARL M. WELCH
BY Gustave Miller
ATTORNEY

INVENTOR
EARL M. WELCH
BY Gustave Miller
ATTORNEY

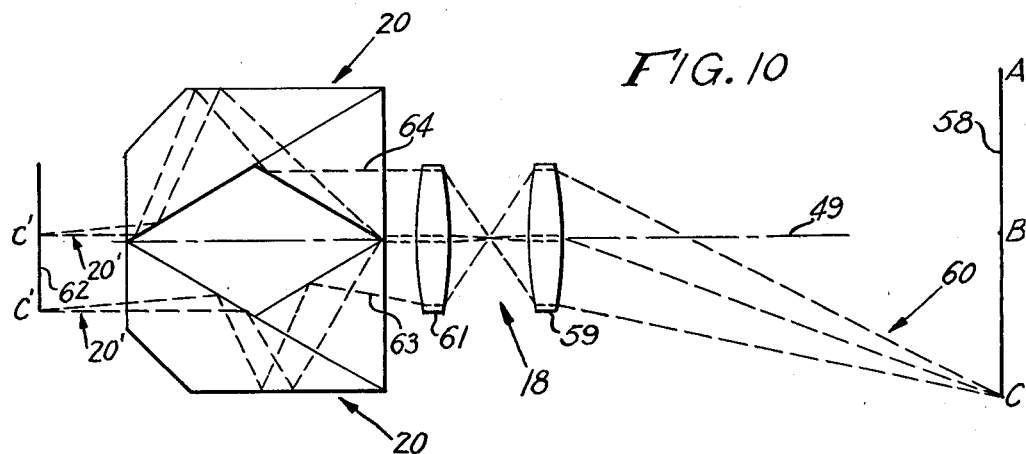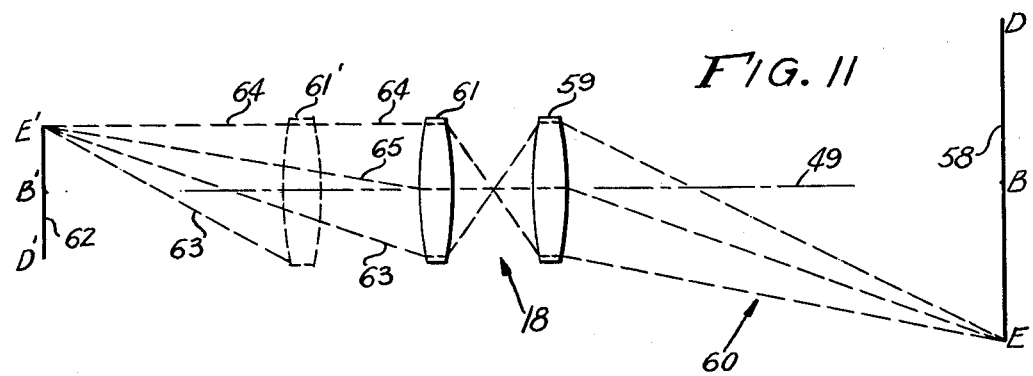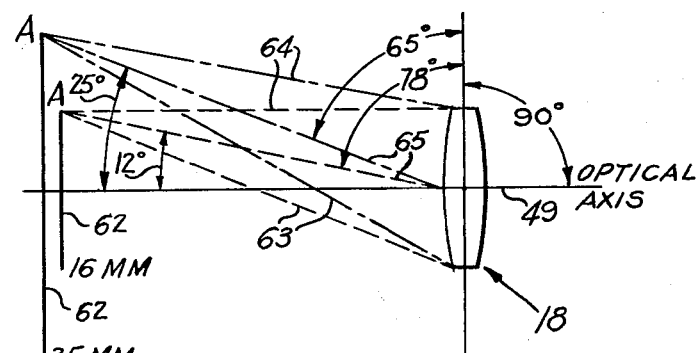

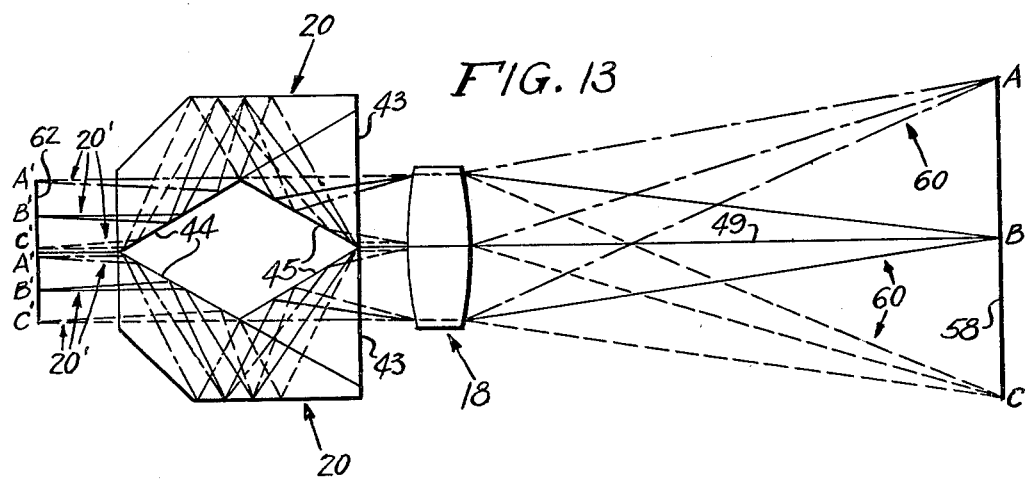
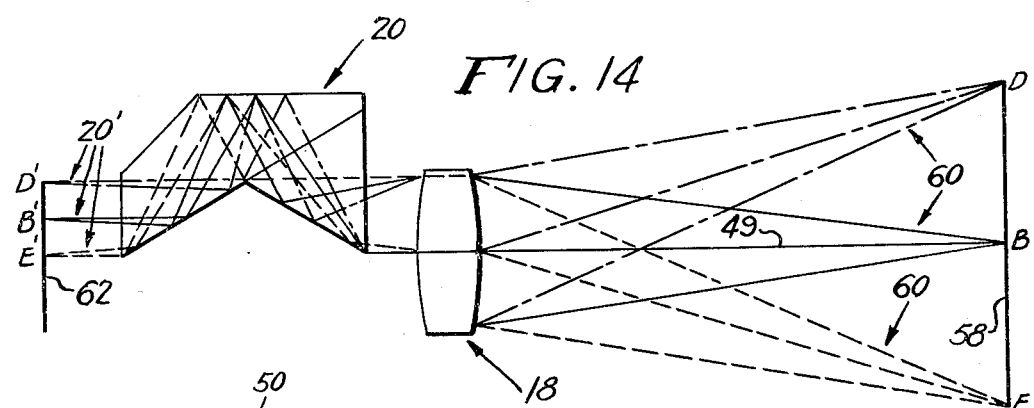
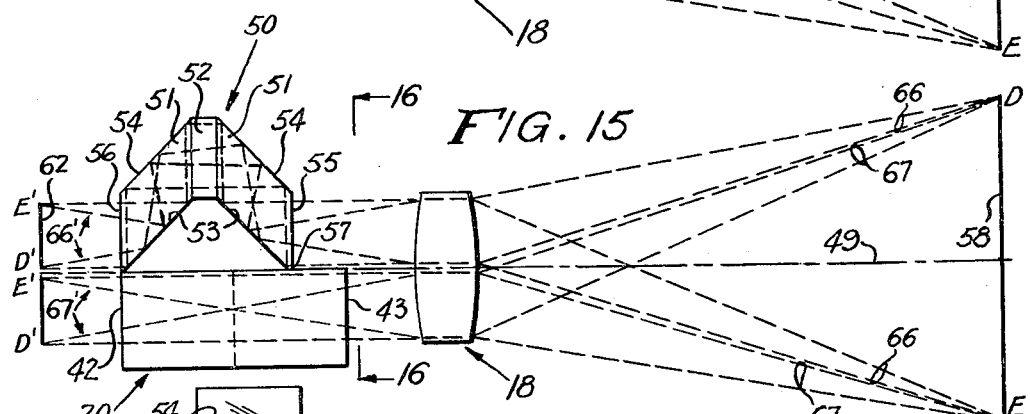
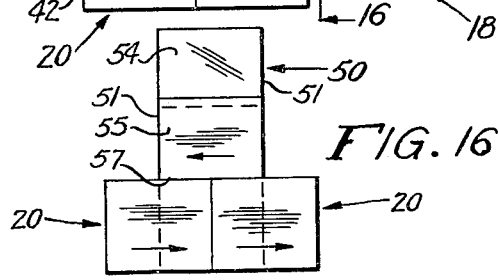
INVENTOR
EARL M. WELCH
BY Gustave Miller
ATTORNEY

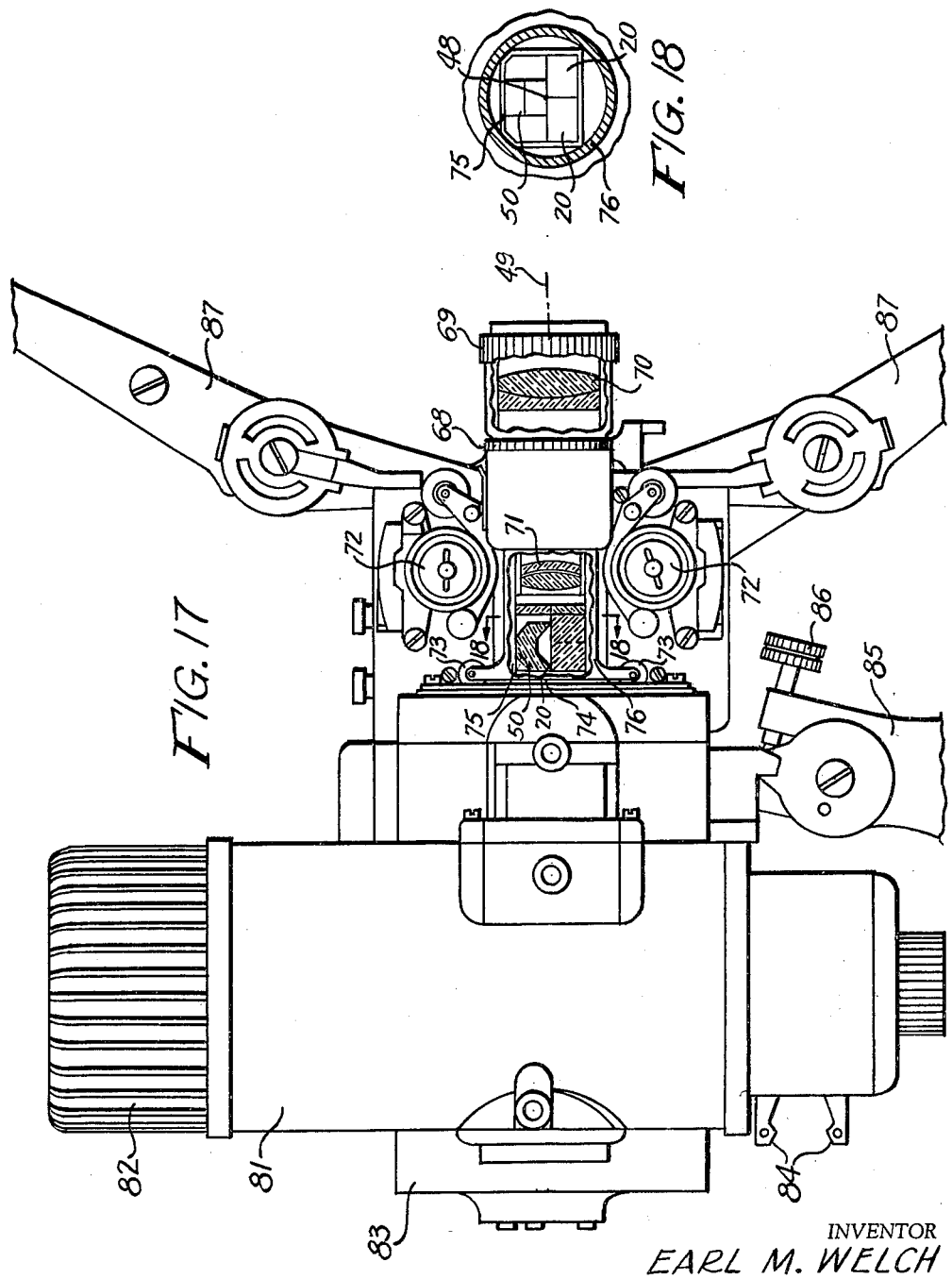

Sept. 12, 1961 E. M. WELCH 2,999,421
CAMERA AND PROJECTOR SYSTEM
Filed Nov. 20, 1957 8 Sheets-Sheet 7

INVENTOR
EARL M. WELCH
BY Gustave Miller
ATTORNEY

United States Patent Office 2,999,421
Patented Sept. 12, 1961

2,999,421
CAMERA AND PROJECTOR SYSTEM
Earl M. Welch, New York, N.Y., assignor to Mecca Film Laboratories Inc., New York, N.Y.
Filed Nov. 20, 1957, Ser. No. 697,704
3 Claims. (Cl. 88—16.4)

This invention relates to photography and to the projection of pictures onto a screen, and more particularly to an optical system for cameras and projectors which incorporates a beam-splitting device for obtaining a triple image on black and white film, which when projected through the projector system, is reunited into a single image which may be either in black and white or in natural color, as may be desired, and may have a distinct three-dimensional quality if desired.

The purpose of the invention is specifically to provide a system for the utilization of the well-known principles of the three basic color additive process for the photographic reproduction of natural colors, which will be free of the basic imperfections which heretofore have prevented its general use, and equally importantly, to obtain a device which will, at the same time be practical, inexpensive and free of adjustment of any kind other than that of normal focusing and illumination control, and which may be used in combination with a photographic objective as a beam-splitting device and with a projection lens as a beam-coordinator, and which may be designed as an accessory for any existing standard equipment without requiring any alteration or modification of such equipment and without modification in the existing processing or projection technique.

Basically, the unit herein described consists of an inverted telescopic or long focus lens, used to obtain two important results: first, to widen the angles of reception for providing an expanded area of coverage and diminished angles of emission to permit three identical and like images, each having specific color information in non-chromatic form, and one blank image area to be contained within a reception area normally containing one of the three images, and to maintain normal perspective at normal distances; and second, to provide a greater than normal distance between the rear element of the lens and the film plane in order to permit a beam splitting device and a system of color filtration to be positioned between said rear element and the film plane.

This invention further provides a simple attachment which is applicable for use in either motion picture or still picture photography and projection, and provides a simultaneous production of three images on a single frame in black and white which can subsequently be reproduced as a single image either in black and white or in natural colors, and either with or without three dimensional effect, as may be desired, by means of a projector provided with this attachment used as a reconverting apparatus.

The techniques and processes for the manufacture and processing of color film are quite complicated, with the result that the price of color film is very high and often beyond the economic means of the average photographer.

While various optical systems are known for the production of color photographs using black and white film, most of the known systems do not utilize to the best advantage the available light when taking photographs. That is, most of the presently known optical systems for obtaining color pictures using black and white film obtain a double image by forming one of the images by direct light transmission and forming the other image by a mirror reflection. In such systems, a large percentage of the light transmitted by the lenses is wasted and the exposure must be correspondingly increased to obtain images of satisfactory density.

An optical system for producing color pictures with black and white film in accordance with some of the basic principles of the present invention, was initially disclosed in my prior Patent No. 2,280,989, issued April 28, 1942. This was followed by my pending application, Serial No. 390,644, filed November 6, 1953, now U.S. Patent No. 2,882,782, on an improved construction of the beam-splitting and coordinating devices. The present invention is a further improvement on these optical systems, incorporating the use of a triple image on each frame of the black and white film.

The patent mentioned above discloses an optical system for taking color photographs using black and white film, in which a prism assembly for splitting the image, in a camera, or for integrating or superimposing the split image in a projector, is symmetrically positioned on either side of the optical axis of the lens system of the camera or projector. The prism assembly disclosed in this patent requires the use of at least six separate prism elements which are assembled into a unitary structure in such manner as to split the image produced by the lens system into two side by side identical images. These two separate images are subsequently passed through separate color filters, such as an orange-red filter and a blue-green filter, before striking the film which is being exposed. The two side by side images are formed on the film, each image being modified in accordance with the light rays forming the given image pass before reaching the film. The film containing the two side by side images is then subsequently run through a projector which is provided with a similar prism assembly and filter arrangement, which serves to integrate the split images, so that the two side by side images are ultimately superimposed to form a single resultant image in color.

While the above color photography and projection apparatus performs satisfactorily, it has the disadvantage that the image splitting prism assembly disclosed in said patent is quite expensive to manufacture, since it requires at least six prism elements in its construction which must be precisely matched and dimensioned, as against only four prism elements required in the device of the pending application.

The pending application, now Patent 2,882,782, referred to above, has for its object, to provide an improved apparatus for taking and projecting color photographs using black and white film which is simple to operate and inexpensive to manufacture, the improvement being mainly in the simplification of the prism assembly of the beam splitting and integrating device, which requires only four prisms, two of which are identical equilateral triangular prisms, the other two being identical right triangular prisms having complementary angles of 60° and 30°. These prisms are formed into two subassemblies, each subassembly containing one right tringular prism and one equilateral triangular prism, the two prisms being brought into optical contact with each other in such manner that a base surface of the equilateral triangular prism is in contact with the hypotenuse surface of the right triangular prism, with an apex of the equilateral prism in register with the apex of the 30° angle of the right triangular prism.

The two subassemblies thus formed are then positioned in contacting relation with respect to each other and symmetrically disposed so that one of the subassemblies is on either side of the optical axis of the lens system of the camera or projector, in a manner similar to the two three-prism subassemblies of the patented disclosure.

In both the above devices, the basic fault was that of utilizing only two color separations, blue green and orange red. It was thus impossible to reproduce a full color spectrum. The system would not reproduce either a true blue or yellow.

The present disclosure is a further improvement over the previous systems, whereby the beam splitting and integrating device is composed of three subassemblies of prisms similar to the previous subassemblies, for the purpose of providing three identical images on a single frame of a black and white film, each image having specific color information in non-chromatic form, so that when the three beams from these images are reunited after passing through corresponding color filters, in a projector, they will produce a composite image in natural color. By using the primary colors for the three color filters: blue, red and yellow-green, more natural colored composite images could be readily produced.

Means may be incorporated in the camera apparatus to cause at least one of the three images to be slightly dissimilar so that a three dimensional effect is provided when at least two of the images, including the dissimilar one, are recombined and projected. In accordance with a further feature of this invention, means may be provided in the projecting apparatus for slightly shifting the prism assembly or the split beams wtih respect to the lens system of the projector in such manner as to obtain a displacement of the projected images of at least two of the three images which will provide a three dimensional effect. In either case, the two dissimilar images should be viewed through isolating filters to obtain a pronounced three dimensional effect.

The image splitting prism assembly is preferably symmetrically positioned with respect to the vertical plane through the optical axis of the camera and projector lenses, the principal axes of the three split beams being substantially equiangularly spaced about the principal optical axis of the lenses, so that substantially all of the light transmitted by the lenses strikes the image splitting device and is transmitted onto the film. Although this transmitted light is divided into three equal parts by the image splitting device, each part impinges upon an area of the film equal to substantially one third of an ordinary picture, so that the amount of light on each part is substantially the same as it would be for an ordinary picture taken in the ordinary way without the image splitting assembly of the present invention.

Furthermore, in accordance with this invention, there is no possibility of interference between the divided beams of light which produce the three images. The construction of the camera or projector and its lens system is entirely unaffected by the addition of the devices of this invention. No change is required in any feature of ordinary black and white photography, and the focal length of the standard lenses with which the camera or projector is provided remains practically unchanged. In projection, the three images are brought into coincidence as they pass through the projector lenses, so that no defects in superimposing the images over each other is possible as a result of mismatching or other inconsistencies in the projector lenses. In using the image splitting device of this invention, the size and position of the three images upon the single film frame is maintained automatically regardless of the distance between the subject being photographed and the camera. Likewise, in projection, the three images are accurately superimposed without any adjustment whatever, regardless of the distance of the screen from the projector, it being assumed, of course, both in photography and in projecting, that the normal camera and projector lenses are correctly focused in the usual manner by the usual lens focusing means. Lenses of varying focal lengths can be used without affecting the image splitting unit or its position. In short, the unit is simply installed in the camera or projector and may then be forgotten insofar as subsequent adjustment and operation are concerned.

By the use of this invention in photography, as in my previous disclosures, films of very uniform density are obtained regardless of variations in the actinic strength of the light. This is due to the fact that any normally used black and white negative material possesses many times the latitude of any dye saturated material, whether the dyed film material is directly dye impregnated, or of the dye coupler type. It therefore becomes possible to vary exposures or conditions considerably either over or under the optimum point and still obtain what is considered a normal exposure. It has been proven by many actual experiments that photographs taken throughout the day from early morning to early evening with no change in lens aperture or exposure time, or time or temperature of development, have densities so nearly the same that they are all so well within the limits of correct exposure and color value as to be considered uniform for all practical purposes. This is of very great practical importance in both motion picture and still photography since it eliminates the necessity of varying the light in the printing machine and insures positives of substantially correct density, contrast, and color balance from one end of the roll to the other.

Other and more specific objects and novel features of this invention will become apparent in the following detailed description of preferred forms and arrangement of parts applied to camera and projector optical systems, as illustrated in the accompanying drawings, wherein:

FIG. 1 is a side elevational view of a movie camera, with portions of the lens tube broken away to show the application of the present invention to the lens system normally used in such camera.

FIG. 2 is a vertical section through the lens tube taken on the line 2—2 of FIG. 1.

FIG. 10 illustrates the halving of a single light beam through two similar but opposed units and the various incidence of angles required for producing identical images and their identical positioning.

FIG. 11 illustrates the altered angles of incidence within a given image area caused by various focusing positions of a normal lens system utilized normally or without a secondary beam splitting unit.

FIG. 12 illustrates the various and differing angles of incidence necessitated by differing areas of coverage without a secondary beam splitting unit.

FIGS. 13 and 14 show the individual light paths from several points on the object to corresponding points on the three images, through the opposed horizontal units and through the third, vertical unit respectively.

FIG. 15 shows the light paths through an assembly having a modified form of the third, vertical unit.

FIG. 16 is an end view of this modified assembly.

FIG. 17 is a side view of a projector with portions broken away to show the arrangement of parts in the optical system.

FIG. 18 is a vertical sectional view of the lens tube, taken on the line 18—18 of FIG. 17.

Figure 3:
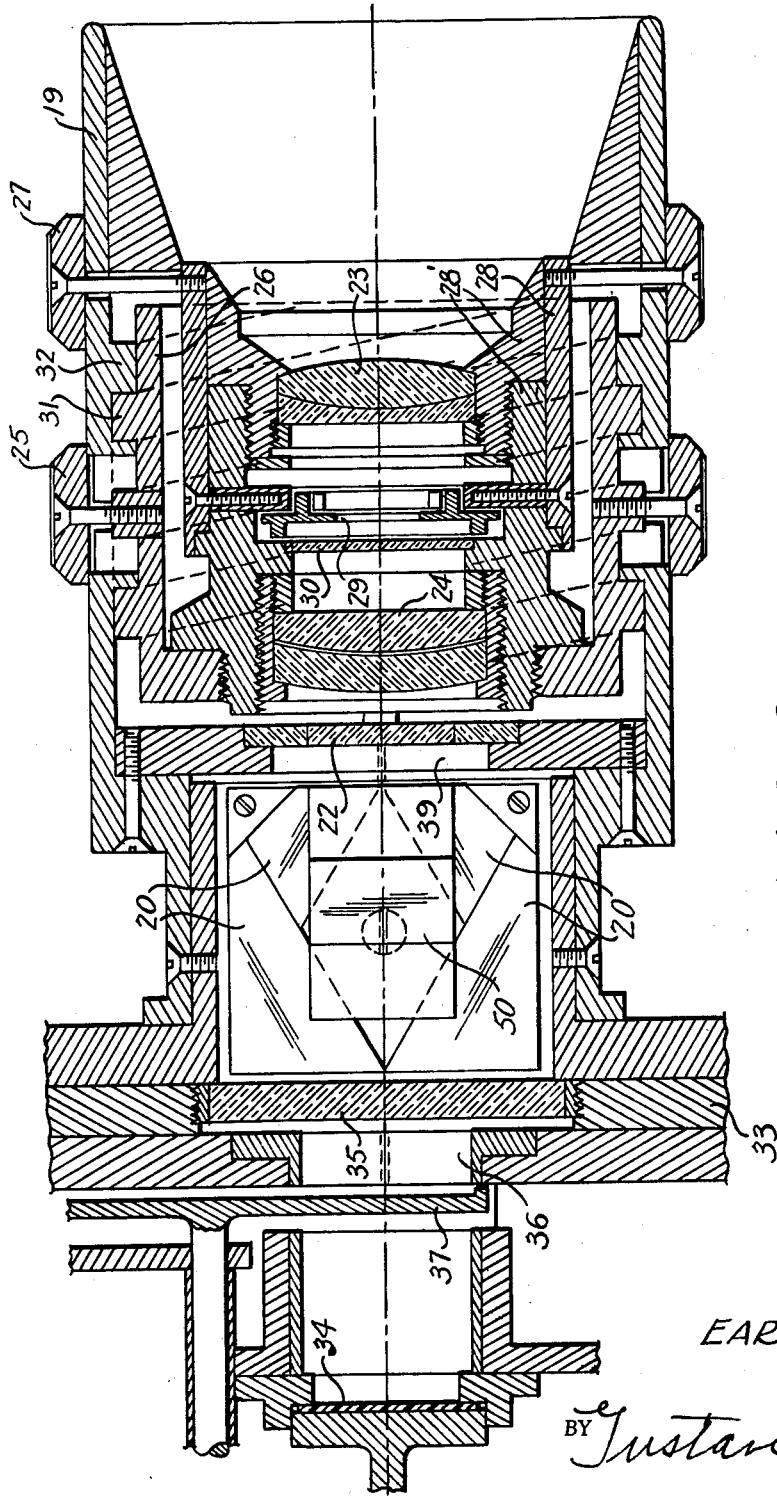
FIG. 3 is an enlarged sectional view in plan, through the camera optical system showing a preferred form and arrangement of the parts of the present improvement adapted to this type of camera.

The camera shown in FIG. 1 may be considered a typical movie camera having a stem winding spring motor 10 with winder handle 11 hinged at 12 to stem 13 for moving flat against the camera wall when not in use. It is provided with typical film footage and speed setting indicator dials and a manual operation hand crank 14.

A turret 15 with three different lens assemblies 16, 17 and 18 is rotatably adjustable on the front of the camera to turn any one of these lens assemblies into operative position. The telescope lens 18 is shown in such operative position in FIG. 1. The lens tube 19 is broken away to show the lens system in section, and the arrangement of the beam splitting units 20 and 50, and a color filter assembly 22 back of the normal lenses 23 and 24.

A similar arrangement is shown in FIG. 3 on a larger scale, where the typical lens adjusting ring 25 and its operative connections to the internal sleeve or barrel 26 carrying the lens assembly, may be more clearly seen. A second adjusting ring 27 connected to a second internal sleeve 28, operates the aperture iris 29 by means of the internal sleeve 28 rotating around the lens barrel 28'. A reticle 30 may be used back of the iris 29 to prevent image interference and overlapping.

The lens barrel 26 has an external screw thread 31 operating in the internal thread 32 of the lens tube 19 so that adjustment of the ring 25 to turn the lens barrel, will adjust the lens assembly axially of the lens system to any required focus in accordance with the object distance.

The beam splitting units 20 and 50 form an assembly that may be fixedly mounted in the lens tube between the image emitting lens element 24 and the film 34. The three-color filter 22 has red, blue and blue-green portions axially aligned with the three beam splitting units and is fixed in the lens tube 19 in front of the prism assembly. Any corrective filter 35 mounted in slide frame 33, may be used back of the prism assembly, if desired. In order to prevent interference between adjacent beams in the space between the back of the prism assembly and the film, a mask 36 is mounted on one side of the shutter 37. This mask is axially aligned with the partition planes between the three units of the prism assembly. A similar mask 39 may be used in the space between the filter 22 and the prism assembly.

Figure 4:
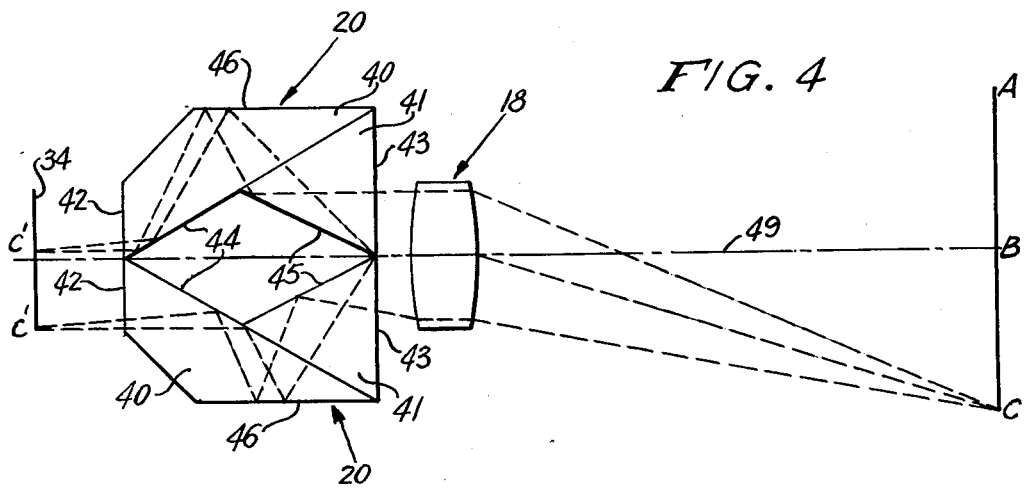
FIG. 4 is a plan view illustrating halving of a single light beam through two similar but opposed units and the various declination of angles required for producing identical images and their identical positioning.
Figure 5:
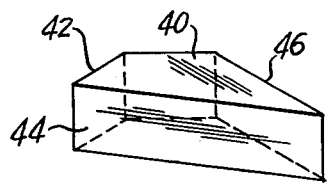
FIG. 5 is a perspective view of a right triangular prism used in making up some of the units of the beam splitting device.
Figure 6:
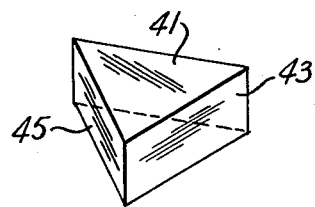
FIG. 6 is a perspective view of an equilateral triangular prism also used in making up some of these units.
Figure 7:
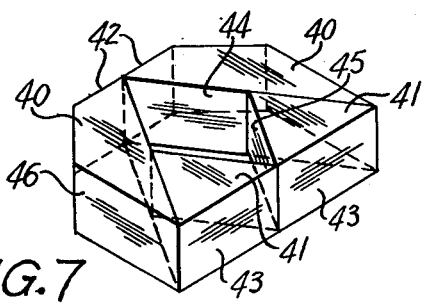
FIG. 7 shows in perspective a pair of units assembled for providing two of the three split beams of the beam splitting prism assembly.

A pair of opposed units 20 are shown in plan view in FIG. 4 to show how a light beam from a single point C on the object ABC is passed through the lens 18, and is then intercepted as it emerges from the other end of lens 18, by the pair of opposed units 20, 20, which split the beam and reflect each half of it three times through equal distances in each unit before allowing the halves to converge to a focus on corresponding points C' of two identical images on the film 34 in identical positions.

Each of the units 20 is composed of two prisms: a right triangular prism 40 preferably with a corner of the right angle portion cut off and blackened, to prevent stray light rays from going directly through the corresponding unit without reflection, and an equilateral triangular prism 41, one side face of which is fused or cemented to the hypotenuse face of prism 40 adjacent its 30° angle apex and extends from said apex to a line at the midpoint of said hypotenuse. Thus, each unit has parallel end faces 42 and 43 for transmission of light, and three internally reflecting surfaces 44, 45 and 46, which may be silvered and blackened on the outside, if desired.

Figure 8:
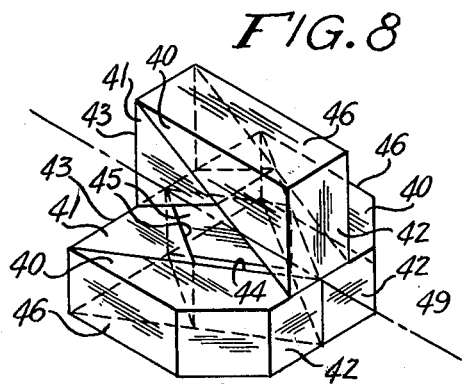
FIG. 8 is a perspective view of a complete beam splitting prism assembly, using three unit assemblies similar to the above pair.
Figure 9:
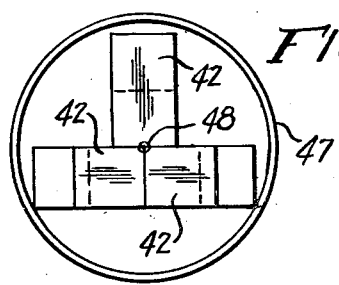
FIG. 9 illustrates the arrangement of the three prism units that may be used with this assembly.

A third unit 20 may be positioned as shown in FIG. 8 to make up the beam splitting and integrating prism assembly which may be suitably mounted in a tube 47 and adapted for installation in any lens system desired, the point 48 in FIG. 9 being substantially on the optical axis of the lens system. It will be understood, that the three apex edges of the equilateral prisms 41 which meet at the optical axis 49, have to be relieved sufficiently to separate the images provided by the three split beams, so that they will appear in closely adjacent spaces on the film about the optical axis, in substantially the same symmetrical arrangement as the end faces of the respective units 20.

It will be noted that the separate image beams as well as every light beam in each image beam travel substantially the same distances through the respective units 20 and will therefore come to a focus on the same plane for which the lens system may be adjusted; and once the beam-splitting assembly is properly mounted, the lens system may be adjusted for any distance or lighting of the object in the usual manner without requiring any adjustment of the beam splitting assembly.

The third unit 20 shown in FIG. 8 has a right triangular prism 40 which does not have its right angled corner cut off, to show that it is not essential for proper operation to have it cut off on any of the units 20, since this corner has no effective surfaces and has to be blanked out anyway by masking to prevent stray light going directly through the units without striking the reflecting surfaces, as previously mentioned.

It may be desirable for some purposes, to substitute this third unit 20 by a unit 50 providing an additional reflecting surface but substantially the same distance for its image beam to travel therethrough as through the units 20, taking into account the increased glass path which it provides, so as to bring its image on the same focal plane as the other two images.

This unit 50 may be made of two rhomboidal prisms 51 and a rectangular prism 52, fused or cemented by a transparent cement, as shown in FIGS. 15 and 16, the axial dimension of prism 52 being determined by the requirements for equalizing the optical distance of the beam travel from the lens to the film through this unit 50 with those through the other units 20 which are used in the same assembly of the beam splitting device. The rhomboids having parallel 45° reflecting surfaces 53 and 54, and parallel receiving and emitting faces 55 and 56 for the beams emitted by the lens 18, provide for four reflections and reversals, and therefore a return of the image beam to its arrangement before it entered this unit, whereas the other two images are reversed transversely with respect to this unit.

In practice it was found that the beam splitting assembly, with three units 20 symmetrically arranged as in FIG. 8, performs without imperfection when utilized in conjunction with precision equipment having means of precisely and constantly positioning negative photographic materials with relation to the optical system used in conjunction with such equipment and equally within a given aperture area. However, it is realized that when utilized with amateur or worn and imperfect equipment having imperfect registration for successive frames, any such unsteadiness would be translated, upon projection, in opposing directions, especially if the assembly was oriented in the lens system with the opposed units positioned transversely of the direction of feeding of the frames. This would place the image from the third unit 20 in a reversed position relative to those from the opposed units 20, both laterally and longitudinally reversed with respect to the frame feeding direction as indicated in FIG. 9 by the images of a distinctive figure. Hence, any unsteadiness in the frame feeding or guiding equipment, would obviously be translated in opposing directions in these reversed positions of the images.

This misregistration error while almost imperceptible was found to be actual even in what was thought to be precise equipment in good order.

However, another way, which is preferred, is to use the unit 50 in the assembly of the device with the opposed units 20, as described above, and orient the device in the lens system as before. This brings the images all into the same longitudinal positioning, even though one image is reversed transversely relative to the others. Since the unsteadiness, if any, is usually limited to be in the direction of feeding of the frames, whether it be in a movie camera or still picture camera or projector, the resultant misregistration and microscopic fringing is eliminated.

It is to be understood, of course, that the edge 57 of this third unit 50 has to be relieved sufficiently to bring its image substantially to the top of the optical axis on the film or other exposure surface 34.

Going into the details of ray tracing through the beam splitter units, and referring first to the illustration in FIG. 11, a light beam from a point E on the object 58, is gathered and collected into the collective element 59 of the lens assembly 18 of a camera in the form of a cone of illumination 60, the dimension of the base line being determined by the effective aperture of the lens system, the apex or tip of said cone of illumination being positioned at the point E.

Emerging from the emission element 61 of the lens 18, said light from the point E is in the form of a bundle of light, conically shaped and having no characteristics of image form until it approaches the image or focal plane on the film surface 62.

The physical dimensions of the base plane, as may be seen in FIGS. 11 and 12, is determined by the dimensions of the effective aperture of the lens system, and the angle of emergence of the beams toward the focal plane is determined by the focal length of the lens system, the distance of the lens system from the focal or image plane, and the physical dimensions of the aperture or image area.

It will also be noted that the angles of inclination of the bundle or cone of light is progressive or retrogressive as the case may be. That is, as illustrated in FIGS. 11 and 12, that the angle of emergence of one side of the cone 63 is greater than that of the other side 64. The total angle being retrogressive from said side 63 to side 64, therefore results in a mean inclination of the portion of the ray 65. However, the angles of emergence and the angles of incidence of said cone of light to the image or focal plane are varied and altered by each and all of the three considerations above referred to. Therefore, in the functional descriptions, the term "approximate angle" shall be construed to mean the variable mean angle plus or minus the natural variable angle of incidence.

In FIGS. 13 and 14, the individual point beams 60 are shown emanating from horizontally disposed points A, B and C on the object plane 58 and from vertically disposed points D, B and E on the same plane, the point B being on the optical axis 49 of the lens system of the camera. These beams 60 after passing through the lens assembly 18, are split into thre smaller bundles 20′ passing through the three respective units 20, after each bundle from every point on the object has passed through the three corresponding lens areas respectively, these smaller bundles while converging, being simultaneously reflected at corresponding incidence angles with respect to the reflecting surfaces, as shown, and emerge in time to come to a focus on the surface 62 of the film which is in the image plane to form the three separate images in accordance with the type of beam splitting assembly being used. The type shown in these FIGS. 13 and 14 having a unit 20 for the third unit, will invert its image vertically, while the opposed units 20 will invert their images horizontally, the net result being that the latter two images will be identically positioned while the third image will be inverted both horizontally and vertically with respect to the positioning of the other two.

In FIG. 15, on the other hand, the third unit 50 by adding another inversion to its image, projects it in the same vertical positioning as the other two, but the latter having been inverted horizontally in passing through their respective units 20, are both horizontally reversed with respect to the third image, as indicated in FIG. 16 by the relative positioning of the distinctive figure shown.

The individual point bundles 66 shown in FIG. 15 provide the separate beam through unit 50, to emerge therefrom as bundles 66′ which are focused on the film surface 62, whereas the bundles 67 from corresponding points on the object supply the separate beams through units 20, to emerge as bundles 67′ and focus on their respective images on the film surface, in the positioning indicated, as already explained.

Although, in the above description the beams were traced for a camera, as emanating from the object 58 and being focused on the film or other exposure surface 62, they may be similarly traced in a reverse direction for use in a projector lens system, where the source of light is passed through the positive film in the image plane 62, to be projected in the opposite direction through the beam splitting assembly, now used for integrating the three separate images through the projector lens system, which may be adjusted to project them in superimposed relation on a screen in the plane corresponding to the object plane 58.

It will be readily recognized that by a proper setting of the integrating device between the film and the projector lens assembly, the three separate images may be exactly superimposed on the screen to form a composite image regardless of the screen distance, by adjustment of the normal focusing device of the projector lens.

The projector assembly for color projection from black and white film obtained in the camera system shown in FIGS. 1 to 3 equipped with the basic color filters 22, may be seen in FIGS. 17 to 20.

In the side view of a typical portable projector, the lens system is broken away in parts to show the lens assembly with a positioning shoulder 68 and an adjustable focusing ring 69 for focusing the composite image on a screen placed at any desirable distance. By a well known helical groove 77 and pin 78 arrangement between the telescoping tubes, the object lens 70 and the image lens 71, that is, the lens assembly as a whole, may be shifted with respect to the prisms 20 and 50 to provide a focus on a screen at greater or smaller distances with correspondingly greater or less enlargement, as may be desired.

A filter having three sections in the areas of the three separate beams through the three units 50, 20, 20 of the integrating device, is placed between this device and the image lens 71 to provide the three separate image beams with corresponding component color values in accordance with each image information, so that when the three component color images are integrated and superimposed, the natural coloring will be restored on the screen. While the projector shown is a movie projector with film feeding mechanism 72 and typical roller guides 73 and track 74 through the lens system back of the integrating device, the same arrangement is applicable to still picture projection on a projector provided with separate frame feeding mechanism through this point in the lens system.

Figure 19:
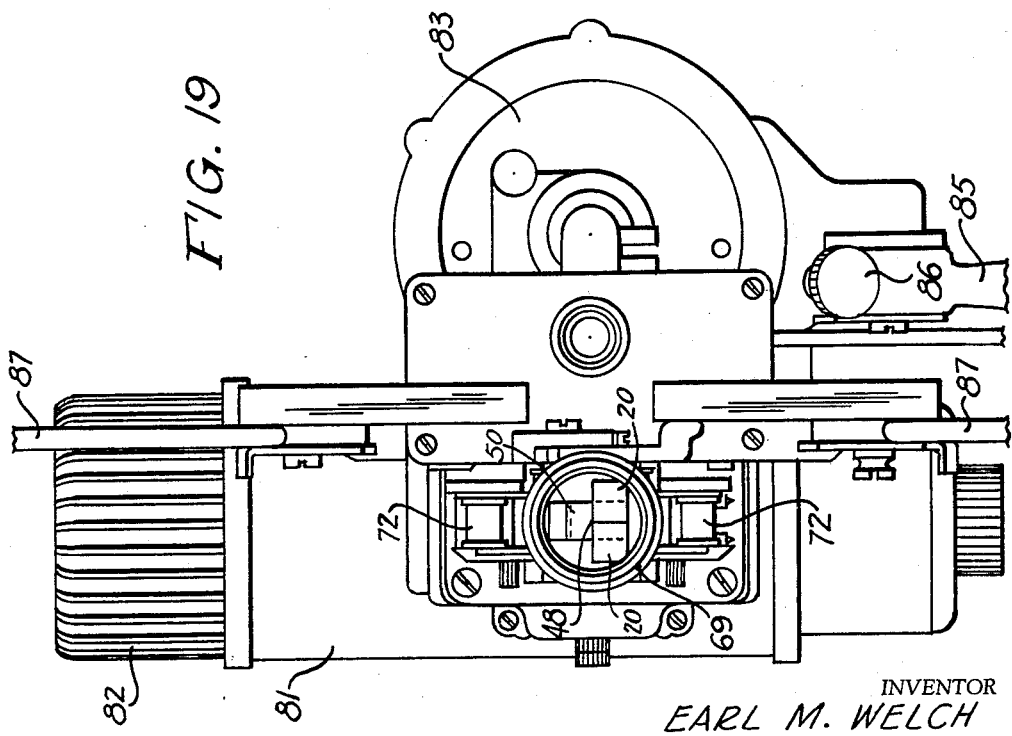
FIG. 19 is a front view of this projector.

As shown in the cross-sectional view of FIG. 18 and the front view of the projector in FIG. 19, the arrangement of the three units 50, 20, 20, is identical in this assembly as in the camera lens system previously described.

The integrating device may be mounted directly in a tube portion 47 in the lens system, or may be mounted in a supporting frame 75 fitted in an enlarged tubular section 76 as here shown. In any case the junction point 48 of the parting planes between the three units is approximately coincident with the optical axis 49 of the lens system.

Thus, when utilized with a projector, the above described prismatic beam splitting device, when positioned with said projector inversely with respect to its operation in the camera, becomes a beam coordinator transmitting three separate, distinct and identical images each having specific color information in nonchromatic form and transmitting said three images to and through the lens system and through an adequate system of complementary tri-color filters and positioning said three identical images upon a projection screen in alignment and superimposition in such manner as to create a photographic reproduction having the identical color values of the original subject matter.

Figure 20:
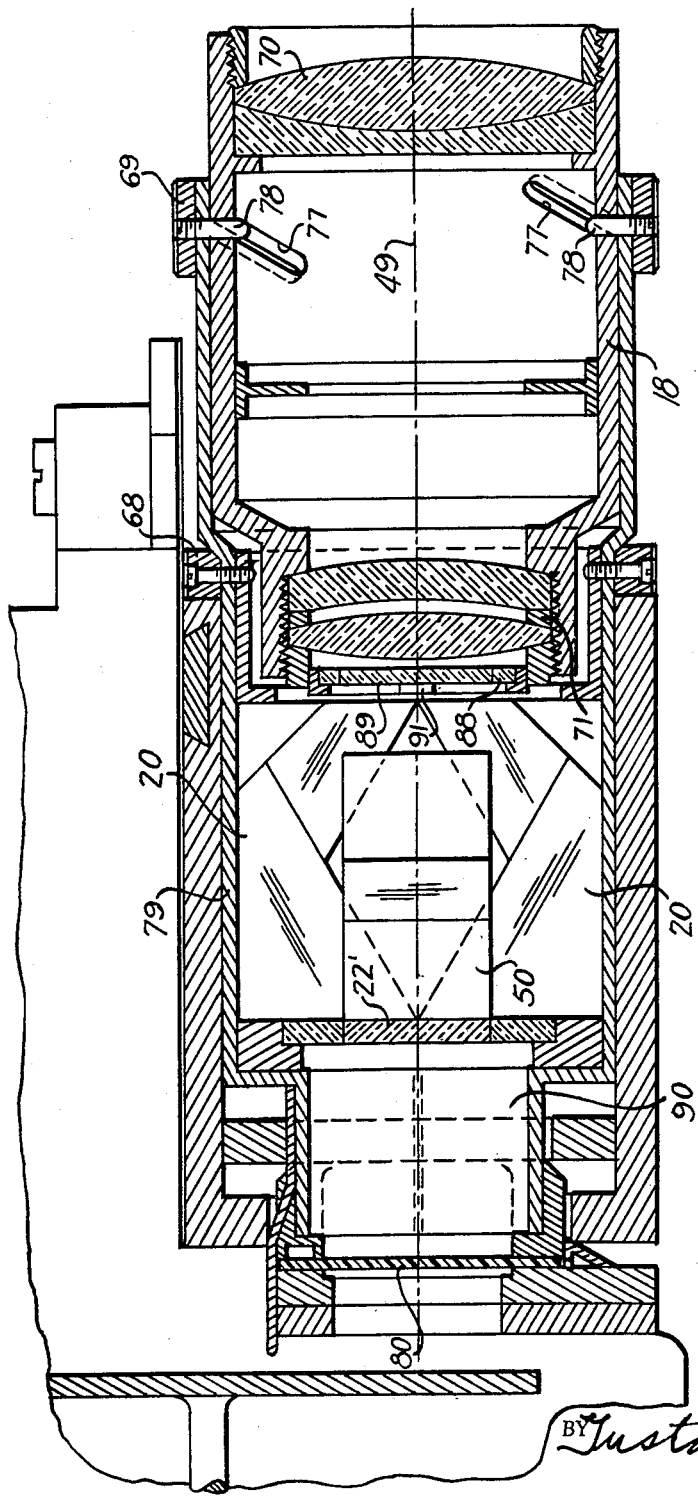
FIG. 20 is an enlarged sectional view through the optical system of this projector.

More specifically, an identical prismatic beam splitting assembly 50, 20, 20, or 20, 20, 20, is conventionally mounted within a conventional projection lens holding tube 79 as illustrated in FIG. 20, and is positioned between the plane 80 of the projection aperture or film plane and the rear element 71 of the lens system in such manner as shown, that the two horizontally opposed lower prism units 20, 20 are positioned longitudinally below and to either side of the optical axis 49 of the lens system. A third prism unit 20 or 50 is positioned longitudinally and centrally above said optical axis; each of the three units being immediately adjacent to and forward from one of the three identical images imprinted upon a positive photographic material positioned within an illuminated projector aperture or image area. Said three prism units 50, 20, 20 or 20, 20, 20 transmitting the aforementioned images to and through a projection lens assembly at such angles and incidences as to cause identical positioning of said three identical images within and upon a projection screen and to hold said images in superimposition upon said projection screen and by doing so, to create a single image having the identical color values of the subject matter originally photographed.

The prismatic beam splitting or coordinating unit has such optical characteristics, angles and incidences as to correctly position three identical images, each having specific color information upon a projection screen in absolute registration and superimposition and to maintain said registration automatically regardless of the distance between the said projector and screen. In other words, no adjustments other than conventional focusing are necessary to maintain registration of said three images upon a screen regardless of distance between projector and screen.

As previously indicated, each of the three identical image projections having been transmitted through a proper color filter, each color filter being supplemental to the color filter through which each of the three aforementioned identical images were recorded, results in a single combined projected image having the identical color characteristics and the identical color positioning of the original subject matter from which these three identical recorded images were made.

The three basic color filters most suitable for true color reproduction as utilized in the present system were red for the third or most visible image, while the two lower images were utilized for the least visible images, blue and yellow green. In precise equipment the three identical units were found satisfactory, but when used in conjunction with less perfect amateur equipment, or worn or imperfect professional equipment, a condition resulted where inaccurate positioning of the images within the image area or aperture were translated upon projection in opposite directions thereby resulting in imperfect superimposition of the third or upper image over the two lower images thereby resulting in an almost imperceptible but nevertheless actual fringing of said upper image. It was found that in these cases, this fringing could be overcome by utilizing the upper or third image for the transmission of the least visible color, blue, thereby making said almost imperceptible vertical fringing to all intents and purposes invisible.

However, a better solution of this problem was found to be the substitution of the four reflection prism unit 50 for the aforementioned identical third unit 20, thereby bringing the three images into directional coincidence vertically each with the others in such manner that any divergency of image placement or positioning resulting from imperfect feeding equipment or other longitudinal irregularity of image placement or positioning would be translated upon projection, in identical directions, thereby resulting in accurate superimposition regardless of mechanical inaccuracy therefor.

The projector assembly illustrated in FIGS. 17 to 19 is composed of the light source housing 81 with ventilators 82 at the top, motor housing 83, and a male electrical inlet plug 84, and is mounted by a hinge to support 85 with an adjusting screw 86. It is provided with foldable reel support arms 87.

The projector lens system illustrated in FIG. 20 has a single adjusting collar 69 for moving the lens assembly 18 as a unit for focusing.

Figure 21:
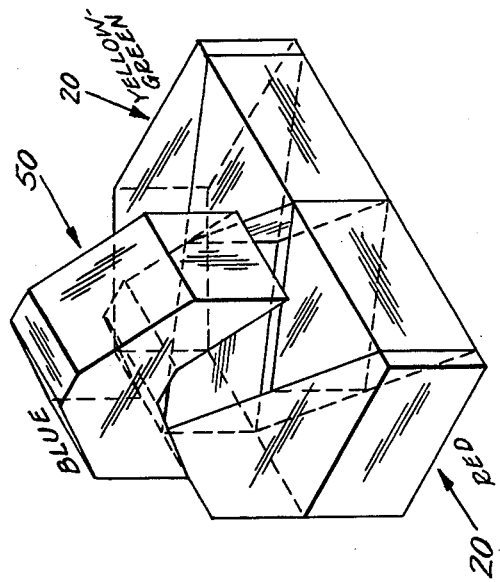
FIG. 21 is an enlarged detail perspective view of the beam splitting device of the modified form, which may be used in this projector.

A three color filter 22' complementary to the three colors used for producing the non chromatic information on corresponding images to be projected by this projector, is mounted just back of the integrating device 50, 20, 20, in front of which a polarizing filter 88 may be used, having a block-out section 89 for the third beam and a vertical deflecting barrier 91 on the vertical axial plane to displace the images from the opposed units 20 horizontally on the screen for obtaining three-dimensional effects with or without the use of polarized viewing filters. The filters may be located in front instead of in back as above, or, each of the three prisms may instead be colored in one of the three primary colors, each prism being a different primary color than the other two prisms, as in FIG. 21. For this purpose the color filter 22' may be omitted and black and white film taken without color filters to provide good black and white three-dimensional pictures in the manner described in my pending application above referred to.

A barrier 90 may be provided between the film 80 and the color filter 22' to prevent overlapping of the light rays from adjacent image beams similarly to the prevention of interference between adjacent beams was obtained by means of the mask 38 in the camera lens system shown in FIG. 3.

Many obvious modifications in form and detail arrangement of parts may be made without departing from the spirit and scope of the present invention, as defined in the appended claims.

Having thus set forth and disclosed the nature of this invention, what is claimed is:

1. In the combination of a conventional lens system having a lens assembly for projecting an image to an image screen, and conventional focusing means for adjusting said lens assembly, with a beam splitting and integrating device fixed on the optical axis between said lens assembly and said screen; a prism structure forming said device for separating the beam between the plane of said image screen and said lens assembly into three separate bundles of light, each bundle terminating in a separate identical image on said image screen, said structure comprising three prism assemblies having rectangular entrance and exit faces, each set of three faces being substantially symmetrically arranged about an axis normal to the optical axis of said lens assembly and having contiguous sides meeting substantially at said optical axis to obtain maximum light area for each bundle from the total circular area of the beam by which the sets of faces are circumscribed, means for holding a film frame in the operative position in the plane of said image screen, in optical alignment to intercept said three separate images on said one frame, said prism assemblies having their axes deflected divergently toward said frame from the optical axis of said lens assembly, so as to place said images in contiguous rectangular spaces similarly arranged on said one film frame, each set of said end faces having their contiguous sides along axes normally across said optical axis and extending radially in a normal direction to said axis respectively, each set of said end faces forming a substantially symmetrical arrangement about an axial plane extended through the radially contiguous sides of two of said faces and passing through the middle of the third face at one end of said device, a basic color filter having a different basic color in the path of each separate bundle, said basic colors being red, blue and yellow green, said color filter being mounted adjacent one end of said device and having the three rectangular basic color areas contiguous with each other along radii in the same axial planes as those of said contiguous sides of said end faces, two of said prism assemblies being fixed in opposed relation on opposite sides of an axial plane through the optical axis of said lens assembly, and at one side of said axis, said two assemblies each having three reflective surfaces in series for the bundles being transmitted, the third assembly being fixed at the other side of said axis across the juncture of the opposed assemblies and having four reflective surfaces in series for the corresponding bundle, said third assembly providing the same light distance between said lens assembly and said image screen as the other two assemblies.

2. The combination defined in claim 1, said third assembly comprising a rectangular central prism, and a rhomboidal prism having 45° and 135° angles joined to each of two opposite ends of said central prism and extending angularly to the same side thereof.

3. In the combination of a conventional lens system having a lens assembly for projecting an image to an image screen, and conventional focusing means for adjusting said lens assembly, with a beam splitting and integrating device fixed on the optical axis between said lens assembly and said screen; a prism structure forming said device for separating the beam between the plane of said image screen and said lens assembly into three separate bundles of light, each bundle terminating in a separate identical image on said image screen, said structure comprising three prism assemblies having rectangular entrance and exit faces, each set of three faces being substantially symmetrically arranged about an axis normal to the optical axis of said lens assembly and having contiguous sides meeting substantially at said optical axis to obtain maximum light area for each bundle from the total circular area of the beam by which the sets of faces are circumscribed, means for holding a film frame in the operative position in the plane of said image screen, in optical alignment to intercept said three separate images on said one frame, said prism assemblies having their axes deflected divergently toward said frame from the optical axis of said lens assembly, so as to place said images in contiguous rectangular spaces similarly arranged on said one film frame, each set of said end faces having their contiguous sides along axes normally across said optical axis and extending radially in a normal direction to said axis respectively, each set of said end faces forming a substantially symmetrical arrangement about an axial plane extended through the radially contiguous sides of two of said faces and passing through the middle of the third face at one end of said device, a basic color filter having a different basic color in the path of each separate bundle, said basic colors being red, blue and yellow green, said color filter being mounted adjacent one end of said device and having the three rectangular basic color areas contiguous with each other along radii in the same axial planes as those of said contiguous sides of said end faces, two of said assemblies being fixed in opposed relation on opposite sides of an axial plane through the optical axis of said lens assembly, and at one side of said axis, said two assemblies each having three reflective surfaces in series for the bundle being transmitted, the third assembly being fixed at the other side of said axis across the juncture of the opposed assemblies and having an equal number of internal reflective surfaces in series for the corresponding bundle, said third assembly providing the same light distance between said lens assembly and said image screen as the other two assemblies.

References Cited in the file of this patent

UNITED STATES PATENTS

| 1,328,291 | Parker | Jan. 20, 1920 |
| 1,873,302 | De Francisco | Aug. 23, 1932 |
| 2,280,989 | Welch | Apr. 28, 1942 |
| 2,678,580 | Erban | May 18, 1954 |

FOREIGN PATENTS

| 350,959 | Germany | Mar. 28, 1922 |